United States Patent

[11] 3,622,323

[72] Inventor Alfred M. Fraser
 12012 Dewey Road, Silver Spring, Md. 20906
[21] Appl. No. 881,675
[22] Filed Dec. 3, 1969
[45] Patented Nov. 23, 1971

[54] PROCESS OF PRODUCING A RELIEF CONTOUR EFFECT FOR TOPOGRAPHIC MAPS
 5 Claims, 12 Drawing Figs.
[52] U.S. Cl. .................................................. 96/41
[51] Int. Cl. .................................................. G03c 5/04
[50] Field of Search ...................................... 96/27, 41, 44

[56] References Cited
 UNITED STATES PATENTS
 3,116,675 1/1964 Trimble ........................ 96/44
 2,309,752 2/1943 Cooke .......................... 96/41
 3,338,766 8/1967 Agnew ......................... 96/41

*Primary Examiner*—Norman G. Torchin
*Assistant Examiner*—Edward C. Kimlin
*Attorney*—Watson, Cole, Grindle & Watson ABSTRACT: A photomechanical process of producing a relief contour effect for topographical maps by means of using a positive transparency form of the topographical map, a negative transparency form produced therefrom, a positive mask transparency prepared for a portion of the map contour lines, a negative mask transparency produced therefrom, a three-ply overlay of the negative transparency positive mask-positive transparency assembled and a positive print obtained therefrom, a three-ply overlay of the negative transparency negative mask-positive transparency assembled and a negative print obtained therefrom, and a final print prepared from both the positive and negative prints.

PATENTED NOV 23 1971 3,622,323

INVENTOR,
ALFRED M. FRASER
BY Watson, Cole, Grindle & Watson
ATTORNEYS

INVENTOR,
ALFRED M. FRASER
BY Watson, Cole, Grindle & Watson
ATTORNEYS

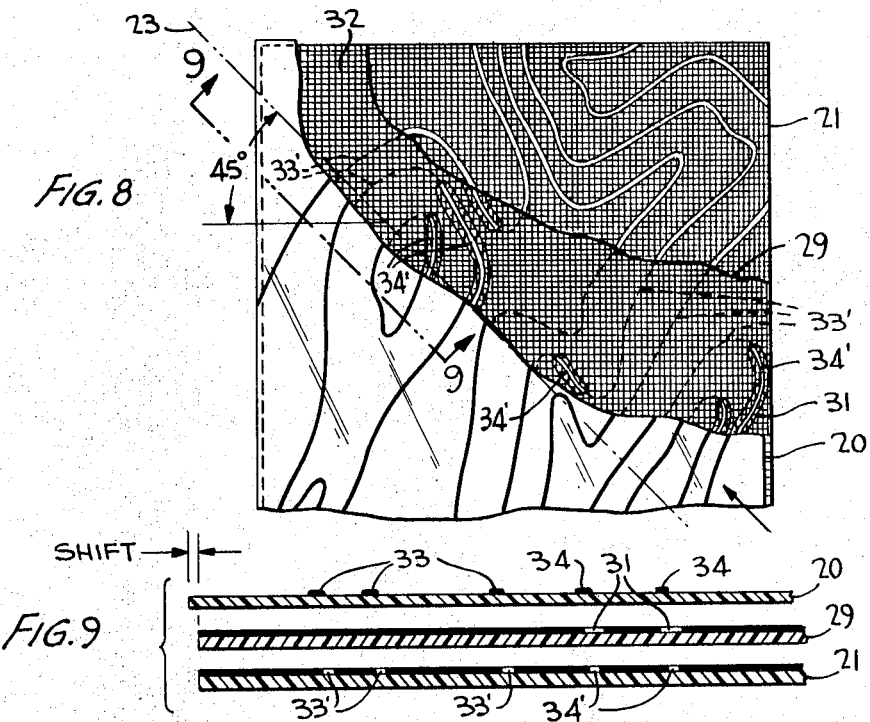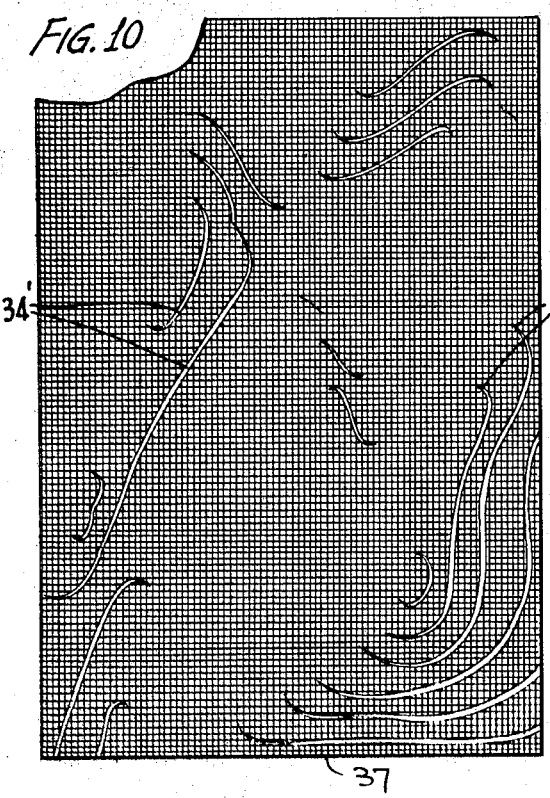

PROCESS OF PRODUCING A RELIEF CONTOUR EFFECT FOR TOPOGRAPHIC MAPS

This invention relates generally to topographical maps and more particularly to a technique for producing topographical maps having a relief contour effect.

As is well known, a contour line on a topographical map represents an imaginary line on the ground connecting an infinite number of points, all points being at the same elevation. If a mountain, therefore, were of a smooth conical configuration, it would be represented on a topographical may by a series of concentric circular contour lines increasing in diameter for depicting the mountain from top to bottom. Naturally, topographical maps are moved involved for those areas having irregular surfaces so that any number of hills, crevices, dropoffs, mountains, shorelines and other types of depressions and elevations will appear on the map as a series of contour lines each connecting a number of points at all the same elevation. In reading such a map, it is assumed that the slope of the ground between contours is uniform so that the absence of contour lines in those areas of a map will represent a uniform or perhaps zero slope of the ground bounded by a pair of contour lines. The difficulty arises with the untrained eye not being able to recognize the abrupt changes in slope from a flat ground surface to a vertical cliff which afterwards levels off and then again abruptly drops off. Map makers have, therefore, resorted to the use of relief maps in order to assist the user in reading topographical maps thereby greatly facilitating the user's understanding of the geographical terrain in question. These relief maps, however, are costly to produce and are so time-consuming for the mapper that their overall use has been limited because of these cost problems. Shading techniques have therefore been developed so as to produce a relief effect for topographical maps which would serve the same purpose as an actual relief map. Nevertheless, shading techniques involve long and arduous work which, although quite presentable, do not effect a substantial cost reduction in producing a larger number of these maps. This invention offers a vast improvement over known techniques for producing topographical maps of the type described above because the relief effect for these maps is able to be now produced more effectively and more economically as compared to most other techniques.

It is, therefore, an object of this invention to produce a relief effect for topographical maps by means of a photomechanical process so that the map will not only be clearly discernible by the unskilled eye, but can be mass produced without the need for specialized training or equipment.

Another object of the invention is to provide such a process which is supplementary to existing topographical map processes due to the fact that the first step of the instant process makes use of a positive transparency of the map from which the ultimate relief effect a map is produced thereby greatly reducing cost and expense of initially reproducing contour lines from the map.

A further object of the present invention is to provide such a process whereby the ultimate print of the topographical map has a relief effect such that the lighted sides of hills, mountains and valleys, when view along a 45° angle, will be depicted by light contour lines whereas the darkened sides of these hills, valleys and mountains will be depicted with dark contour lines for assisting in a clear reading and understanding of the map.

A still further object of the instant invention is to provide such a process wherein the various widths of the light and dark contour lines vary along their lengths with a change of direction for each line thereby further assisting the map reader in discerning the various contour lines of the map.

A still further object of this invention is to provide such a process wherein the widths of the various contour lines are at a maximum for those lines lying perpendicular to a 45° line across a map and wherein the various contour lines are at a minimum across their width for those portions of the contour lines lying parallel to the 45° line, the widths of those portions of the lines between minimum and maximum gradually changing in width.

A still further object of the present invention is to provide such a process wherein a negative transparency is produced from a positive transparency of the topographical map and a select portion of the map contour lines is masked before the positive transparency is overlayed with respect to the negative transparency and, through such an overlay, a print of the remaining portion of the map contour lines is produced after the positive transparency is slightly shifted so as to expose the remaining portion of the map contour lines.

A still further object of this invention is to provide such a process wherein a mask of the remaining portion of the map contour lines is produced before the positive transparency is again overlayed with respect to the negative transparency and a negative print of the select portion of the contour lines is produced through such an overlay after the positive transparency is shifted to expose said select portion of the map contour lines.

A still further object of this invention is to provide such a process wherein the prints obtained of said select and remaining portions of the map contour lines are made to depict said select portions as dark lines and said remaining portions as light lines each varying in width because of the shifting process used.

A still further object of this invention is to provide such a process wherein said prints are alternatively used to produce a final print.

Other objects, advantages and novel features of this invention will become apparent from the following detailed description of the invention when considered in conjunction with the accompanying drawings wherein:

FIG. 8 is a plan view partly broken away showing an overlay of the positive transparency, the negative mask and the negative transparency used in producing another portion of the contour lines in negative form;

FIG. 9 is a sectional view taken substantially along the line 9—9 of FIG. 8;

FIG. 10 is a plan view of the print obtained in negative form from the FIG. 8 overlay; and FIG. 11 is the final print produced from the FIG. 7 and FIG. 10 prints.

Figure 1:
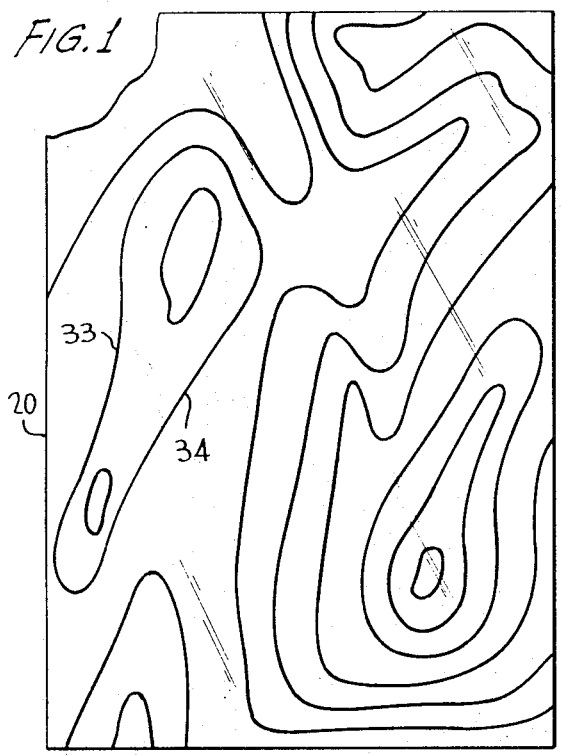
FIG. 1 is a plan view of a positive transparency of the contour lines and which is used as a starting point for the process according to the instant invention.

Referring now to the drawings wherein the reference characters refer to like and corresponding parts throughout several views there is shown in FIG. 1 a positive transparency form 20 having a plurality of contour lines thereon. Since this type of form is one which may have been used in conventional topographic map processes form 20 is readily available and need not be specially produced. Accordingly, the instant technique is merely supplementary to the total mapping process currently practiced so that commencement of the invention would consist merely of interrupting the normal procedure just long enough to make a contact print. A negative transparency form 21 is then produced from the form 20 or, in the alternative, the form 21 may be a form used in the conventional topographic map process from which the positive transparency form 20 may then be subsequently produced.

Figure 3:
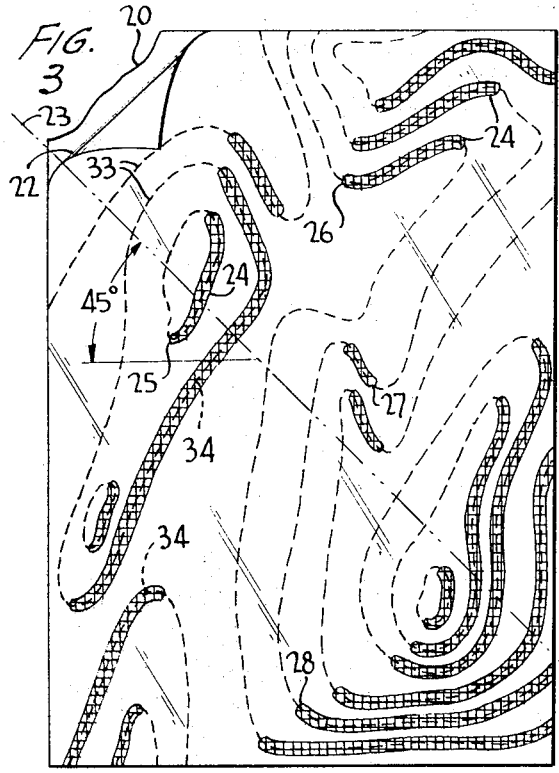
FIG. 3 is a plan view of a positive mask drawn with reference to the FIG. 1 transparency.

A positive mask is then produced on a transparency 22 for masking a select portion 34 of each of the contour lines. The portion selected is those lines which depict that side of a hill or valley which is shaded if a ray of light were beaming across the topography. The masking for the assumed darkened sides is simply carried out by placing a blank transparency over the positive transparency form 20 and thereafter rotating both the blank and the form 20 counterclockwise 45° so that the 45° line 23 shown in FIG. 3 is horizontal with respect to the masking. A dark ink marking pen or like device is then used for shading a portion 34 of each contour line so as to produce mask lines 24. As stated above, these portions of the contour lines are selected for shading for the reason that they will depict the dark side of a mountain or valley assuming that a light is shining in the direction of line 23 from its upper to its lower end. Shade lines 24 are, therefore, drawn commencing with the uppermost portion of each contour line and proceeding downwardly along the contour line and to the right of the remaining portion of such line. It has been found that this technique is effective yet quite simple because the mask lines 24 are drawn toward the drawer so long as his pen moves substantially in a direction toward him. If he finds his pen beginning to move away from him as at 25, 26, 27 or 28, this indicates that the portion of the contour line is not to be shaded because such a remaining portion of the line is beginning to depict the lighted side of the mountain or valley. After a few trials at this, the masker will become quite adept at selecting which of the contour line portions is to be shaded so that after awhile he may quickly and efficiently accomplish the masking task in a short period of time.

Figure 4:
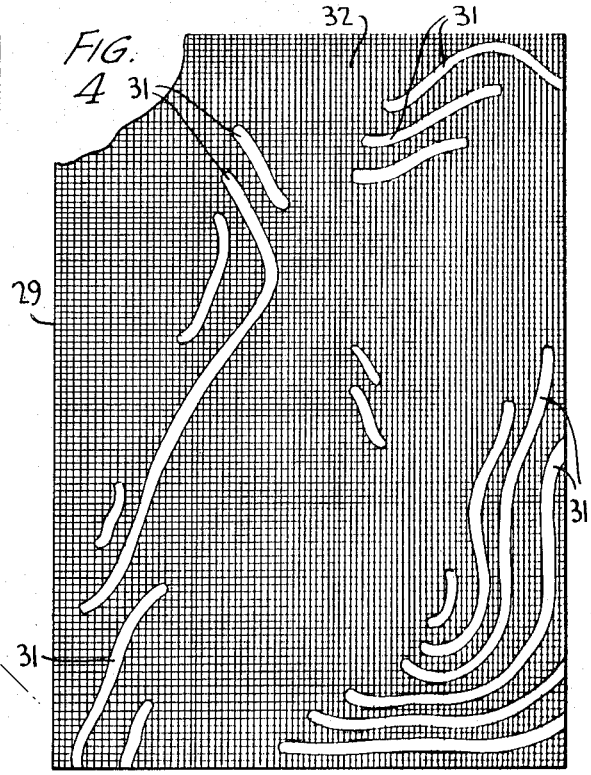
FIG. 4 is a plan view of a negative transparency form taken from the form of FIG. 3.

After the positive mask form 22 is prepared, a negative is prepared therefrom which is shown in FIG. 4 of the drawings and referred to by reference numeral 29. Accordingly, what were positive or dark mask lines 24 on mask 22 are now transparent lines 31 on negative mask 29 with the remaining portion 32 of the mask 29 being darkened by reason of its being a negative. The select portions 34 of the contour lines which were darkened by the shade lines 24 on mask 22 are now exposed through the transparent areas 31 on the mask 29 and the remaining portion 33 of each contour line is now masked by reason of the darkened area 32 of the mask 29.

The ultimate print of a topographical may having a relief effect in accordance with the present invention is arrived at by producing two separate prints on a transparency; the first being a positive of the so-called remaining portions 33 of each of the contour lines, and the second being a negative of each of the so-called select portions 34 of each of the contour lines. (The select portions 34 are those contour line portions lying directly beneath the mask lines 24 as shown in FIG. 3.)

Figure 2:
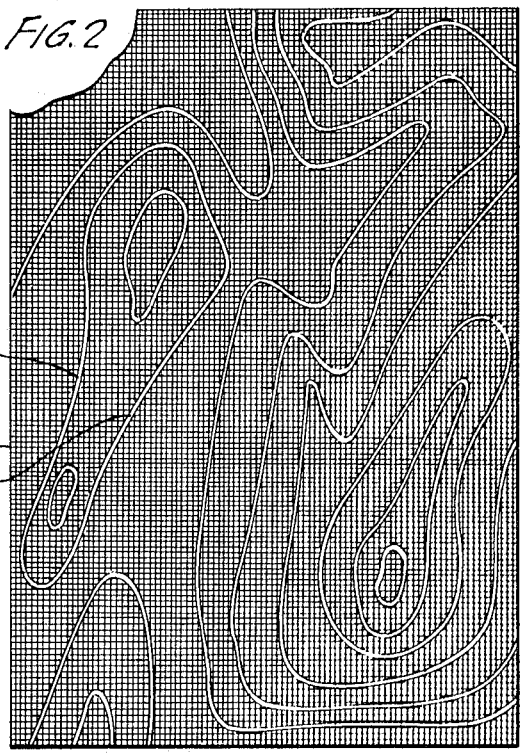
FIG. 2 is a negative transparency form taken from the form of FIG. 1.
Figure 5:
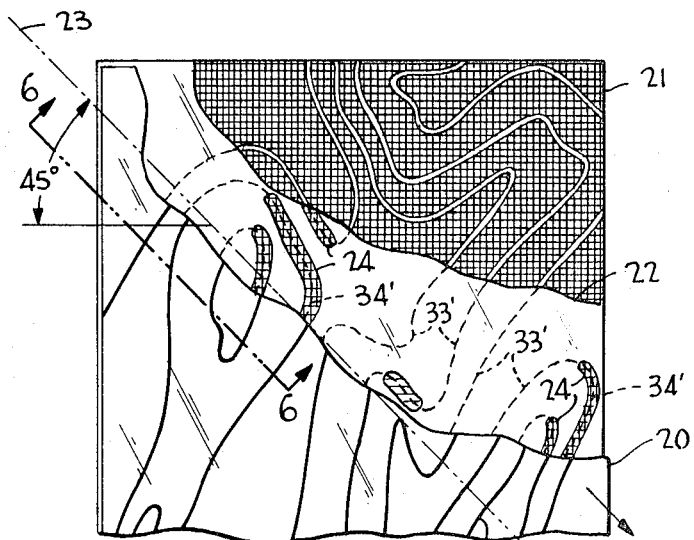
FIG. 5 is a plan view partly broken away showing an overlay of the positive transparency, positive mask and negative transparency used in producing one portion of the contour lines in positive form.
Figure 6:
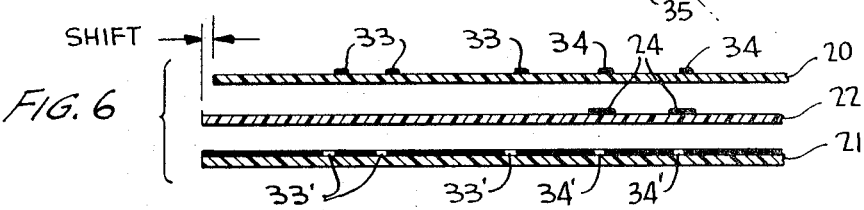
FIG. 6 is a sectional view taken substantially along the line 6—6 of FIG. 5.
Figure 7:
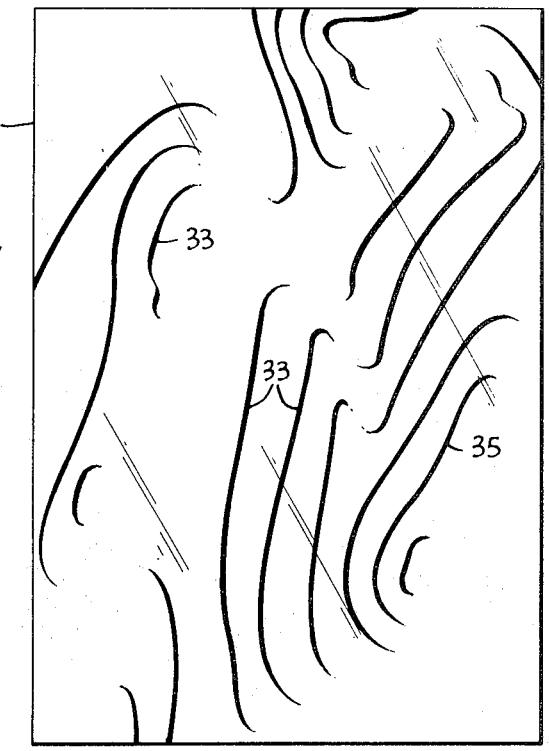
FIG. 7 is a plan view of the print obtained through the use of the FIG. 5 overlay.
Figure 5A:
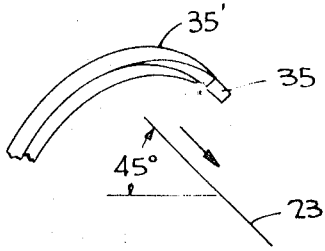
FIG. 5A is an enlarged detail showing a portion of one of the contour lines on the manner of varying its width by means of shifting the positive transparency.

Turning now to FIG. 5 of the drawings, it can be seen that the positive mask 22 is arranged to overlie the negative transparency form 21 so that the shade lines 24 will mask the select portions 34' of each of the negative contour lines on form 21. (The select and remaining contour line portions 34, 34' and 33, 33', respectively, are shown in FIGS. 1 and 2 for one of the contour lines depicting the foot of a hill.) The positive transparency form 20 is then laid over the forms 21, 22 in a manner whereby the positive contour lines of form 20 are coincident with respect to the negative contour lines of the form 21, as can be clearly seen in FIG. 6 if the form 20 were not moved a distance equal to SHIFT. Accordingly, the negative lines on form 21 will all be masked by the positive lines on form 20. In FIG. 5, form 20 is not shown with its contour lines coincident with respect to the negative contour lines of form 21 but is shown after having been shifted slightly downwardly and to the right along the 45° line 23. After shifting, the remaining portions 33' of each of the contour lines on the negative transparency form 21 will be exposed to the viewer through the positive transparency 20 since the selected portions 34' of the contour lines on form 21 remain masked by the mask lines 24 as seen in FIG. 6. It should be pointed out that the form 20 is so shifted a distance equal to approximately the width of a contour line lying perpendicular to the 45° line 23. If this is done, it will be seen that a shift in the direction of the arrow as shown in FIGS. 5 and 5A the contour line 35, for example, of the positive transparency form 20 will expose the entire width of the portion 35' of the contour line on negative form 21 but only where that portion of the line lies substantially perpendicular to the 45° line 23. The portion of line 35' lying other than perpendicular to the 45° line is only partially exposed during shifting of the positive transparency form 20. For example, the arc segment of the contour line portion 35', shown greatly exaggerated in FIG. 5A, will remain partially hidden by the line 35 to a greater or lesser extent depending on that portion of the arc segment lying between a perpendicular position with respect to line 23 and parallel position with respect thereto. Such an exposure of the contour lines on the negative transparency form 21 occurs for all contour lines. It will, therefore, be apparent from FIG. 7 of the drawings that those contour lines which approach parallelism with the 45° line 23 will be thinner than those contour line portions which approach a perpendicular position with respect to the 45° line 23. The geometry brought about by such a shift can be further explained with respect to a pair of concentric circles on each of two transparencies with the upper one being a positive and the lower one a negative shift along a 45° line, similar to that described above, of the top circle will expose to the greatest extent the center portion of the underlying circle lying on or near the 45° line and will expose only a partial width of the remaining portion from that central point toward each end of the arc such that the exposed arcs at each of their ends will terminate in a point which represents the least exposure for that arc after such a shift occurs by the uppermost circle.

After such a shift is made of the positive transparency 20, a positive print 36 of the remaining portions 33 is obtained through the shifted overlay of forms 20, 22, 21 so that the first of two prints (FIG. 7) is prepared for obtaining a final relief effect print to be hereinafter described. Printing of form 36 can be accomplished by any conventional means so long as a positive is produced on a transparency.

With reference to FIG. 8, it will be seen that an overlay similar to that shown in FIG. 5 is assembled except that the negative mask 29 is substituted for the positive mask 22. In such a manner, the select portions 34' of those contour lines on the negative transparency form 21 are exposed through the clear mask lines 31 (see also FIG. 9) while the remaining portions 33' of the contour lines of the form 21 are masked by the darkened area 32 of the negative mask 29. When the positive transparency form 20 is placed over the negative mask 29, it is done so so that its contour lines are coincident with respect to the contour lines on form 21. The coincidence of lines 33, 34 and 33', 34', respectively, will be evident from FIGS. 8 and 9 by assuming that form 20 has not yet been moved a distance equal to SHIFT. FIG. 8, therefore, shows the form 20 after it has been shifted slightly in the direction of the arrow upwardly and to the left along the 45° line 23. In FIG. 9 it will be seen that the shift takes place approximately a distance equal to the width of a contour line on the form 20 of that portion of the line which lies perpendicular to the 45° line 23. The same exposure of the selected portions 34' of those contour lines on the form 21 is thereby brought about to a greater or lesser extent of exposure of each contour line along the same principle as explained with reference to FIG. 5A when the positive print 36 was prepared. After such shift occurs of the form 20, as shown in FIG. 8, a negative print thereof is produced as shown by the transparency 37 in FIG. 10 showing the select portions 34' of the contour lines which are shown tapered to some extent for those portions lying substantially along the 45° line 23.

Using the print 36 showing the remaining portions 33 of the contour lines varying in width between maximum and minimum as above described, and using the print 37 showing the select portions 34' of the contour lines varying in width, a final print 38 is produced in any conventional manner as, for example, on a piece of white base film so that the select contour line portions 34' will be printed in the positive and the remaining contour line portions 33 of the contour lines will be printed in negative with grey or off-white portion of the final print 38 between each of the contour lines remaining after such printing operation. In this way, positive and negative contour lines are printed on the final print in a manner whereby those portions of each contour line depicting a hill or valley facing toward the imaginary ray of light from the northwest quadrant of the print are light lines and the remaining lines are dark, i.e., those lines which represent the side of the hill or valley facing away from the imaginary ray of light shining from the northwest quadrant. In this manner, the viewer will be sufficiently able to envision a hill or a valley more clearly than ever before because the light and dark contour lines slightly tapered along their lengths will actually give the effect of a relief map.

From the foregoing, it can be seen that the relief effect for topographical maps has been produced without the need for special materials or special skills as heretofore required but simply through a photomechanical process as described.

Obviously many modifications and variations of the present invention are possible in the light of the above teachings. For example, form 20 may be translucent and the contour lines drawn thereon freehand or otherwise without such a form being a part of an existing topographical map process. Also, the various positive and negative printing may be carried out in any accepted fashion without departing from the spirit of the invention. It is, therefore, to be understood that within the scope of the appended claims the invention may be practiced otherwise than as specifically described.

What is claimed is:

1. A photomechanical process of producing a relief contour effect for a topographical map, including the steps of:
   providing a positive transparency form of the topographical map contour lines;
   producing a negative transparency form from said positive transparency form;
   firstly masking a select portion of the topographical map contour lines on said negative transparency form;
   firstly overlaying said positive transparency form and said firstly masked negative transparency form so that their contour lines are coincident;
   firstly shifting said firstly overlaid positive transparency form so as to expose the remaining portions of the topographical map contour lines;
   printing through such shifted overlay to obtain a first print of said remaining portion of the topographical map contour lines;
   secondly, masking the remaining portion of the topographical map contour lines on said negative transparency form;
   secondly overlaying said positive transparency form and said secondly masked negative transparency form so that their contour lines are coincident;
   secondly slightly shifting said secondly overlaid positive transparency form so as to expose said select portion of said topographical map contour lines;
   printing through said secondly shifted overlay to obtain a second print of said select portion of the topographical map contour lines, said first and second prints being a positive and a negative, respectively; and
   producing a final print from said first and second prints in a manner whereby said remaining portion contour lines and said select portion contour lines are in the negative and positive, respectively, and are each tapered along their length by reason of said shifting.

2. The process according to claim 1 wherein said select portion masking is prepared on a first transparency sheet by shading the portion of each contour line which depict the hidden side of any number of elevations when viewing said elevations at a 45° angle.

3. The process according to claim 2 wherein said remaining portion masking is prepared by producing a negative of said first transparency sheet on a second transparency sheet.

4. The process according to claim 1 wherein said firstly overlaid positive transparency form is shifted along a 45° angle toward lower right of said positive transparency form.

5. The process according to claim 1 wherein said secondly overlaid positive transparency form is shifted along a 45° angle toward the upper left of said positive transparency form.

* * * * *